July 31, 1928.

J. P. STERK 1,679,180

PROCESS OF MANUFACTURING JEWELRY

Filed Jan. 18, 1927

Inventor

John P. Sterk,

By Clarence A. O'Brien
Attorney

Patented July 31, 1928.

1,679,180

UNITED STATES PATENT OFFICE.

JOHN P. STERK, OF DOLLAR BAY, MICHIGAN.

PROCESS OF MANUFACTURING JEWELRY.

Application filed January 18, 1927. Serial No. 161,851.

The present invention relates to a process of synthetically combining different metals to form ornamental pieces of jewelry such as stickpins, collar buttons, cuff-buttons and the like.

More particularly, the principal object of the invention lies in the provision of a process for synthetically combining copper and silver in imitation of the natural combination of these two metals as is found in the mines. It is now quite the common practice to form articles of jewelry, such as stickpins and the like, from combined silver and copper as found in the natural state, taken from the mine. The designs produced from the natural combination of these two metals is more accidental than intentional. It is one of the principal objects of the present invention to provide a synthetic process allowing different designs to be made in an economical manner rather than leaving the designs merely to chance.

The invention consists essentially in first forming plates of copper and silver and cutting these plates into segments of desirable designs and combining the segments and holding them together with solder, said solder being also used for mounting the segments on a pin or like elements.

Figure 1:
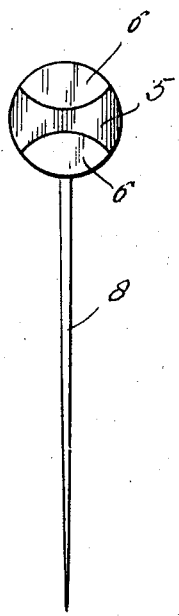
Figure 1 is a plan view of a stick pin resulting from my improved process.
Figure 2:
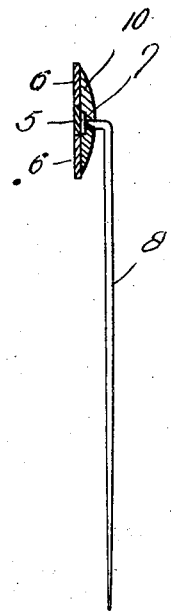
Fig. 2 is a sectional view therethrough.
Figure 3:
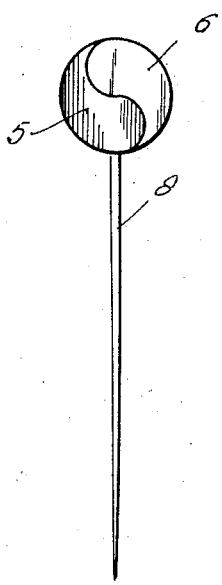
Fig. 3 is a plan view of another embodiment of the stick pin.
Figure 4:
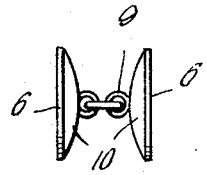
Fig. 4 is an edge elevation of cuff-buttons formed by this improved process.

The first step in this process consists in cutting or stamping suitably shaped segments of copper and silver from plates of such material. The segments of copper and silver are denoted respectively in the drawings by numerals 5 and 6, these segments are cut so as to fit together to form a disk or any other design and when so fitted together a drop of solder is engaged on one face thereof to hold the segments together and in the drop of solder there is imbedded the head 7 of a pin 8, link 9, or the like. The solder is denoted by the numeral 10. The pin, link, or the like, forms the holding element which obviously may be of any suitable formation. I appreciate that it is quite common in the art to combine in jewelry two or more metals by an inlaid process but as far as I am aware I am the very first in the art to combine two or more metals by placing them in edge to edge relationship and in co-planar relationship as distinguished from an inlay formation and holding the segments together on a drop of solder which solder forms a background in which is imbedded the head of a supporting element, such as a pin, link, or the like.

It is thought that the construction of articles from jewelry in accordance with this process will now be apparent to those skilled in this art without a more detailed description thereof. It is apparent that an innumerable number of different designs may be conceived and formed without departing from the spirit and scope of this process as hereinafter claimed.

Having thus described my invention what I claim as new is:—

1. A process of forming articles of jewelry consisting of first forming segments from plates of different metals so that the segments may be placed in edge to edge relationship, then placing a drop of solder on one face of the assembled segments and simultaneously imbedding the head of a supporting element in the drop of solder.

2. A process for forming articles of jewelry from different metals consisting in first cutting segments from the different metals, said segments being designed so that they may be combined in edge to edge relationship and in co-planar relationship, secondly placing the segments in said edge-to-edge and co-planar relationship, thirdly, placing a drop of solder on one face of the assembled segments and simultaneously imbedding the head of a supporting element in the drop of solder.

In testimony whereof I affix my signature.

JOHN P. STERK.